US011457363B2

(12) United States Patent
Voicu et al.

(10) Patent No.: US 11,457,363 B2
(45) Date of Patent: Sep. 27, 2022

(54) SYSTEM AND METHOD FOR SECURING DISASSOCIATED SECURITY CREDENTIALS

(71) Applicant: Telit Communications S.p.A., Trieste (IT)

(72) Inventors: Mihai Voicu, Boca Raton, FL (US); Ian Levine, Petah-Tiqva (IL); Omer Harel, Irus (IL); Alon Segal, Kiriyat Tivon (IL)

(73) Assignee: Telit Communications S.p.A., Trieste (IT)

( * ) Notice: Subject to any disclaimer, the term of this patent is extended or adjusted under 35 U.S.C. 154(b) by 0 days.

(21) Appl. No.: 17/053,499

(22) PCT Filed: May 10, 2019

(86) PCT No.: PCT/EP2019/062068
§ 371 (c)(1),
(2) Date: Nov. 6, 2020

(87) PCT Pub. No.: WO2019/215334
PCT Pub. Date: Nov. 14, 2019

(65) Prior Publication Data
US 2021/0136588 A1 May 6, 2021

Related U.S. Application Data

(60) Provisional application No. 62/670,258, filed on May 11, 2018.

(51) Int. Cl.
*H04L 9/32* (2006.01)
*H04L 29/06* (2006.01)
(Continued)

(52) U.S. Cl.
CPC ............ *H04W 12/35* (2021.01); *H04L 9/0866* (2013.01); *H04L 9/0869* (2013.01);
(Continued)

(58) Field of Classification Search
CPC . H04W 12/35; H04W 12/041; H04W 12/086; H04W 12/50; H04W 12/03;
(Continued)

(56) References Cited

U.S. PATENT DOCUMENTS 10,382,268 B1 * 8/2019 Meyer ................. H04L 41/0806
2015/0312758 A1 10/2015 Redford

OTHER PUBLICATIONS

"Business Process for Remote SIM Provisioning in M2M", *GSM Association*, Version 1.0. Feb. 18, 2015.
(Continued)

*Primary Examiner* — Izunna Okeke
(74) *Attorney, Agent, or Firm* — Pearl Cohen Zedek Latzer Baratz LLP (57) ABSTRACT

A system and method for binding or assigning network access credentials to computer chip modules may include transmitting to a remote server a set of initialization data items each including an identification and a derivation of a secret value; and receiving from the remote server credential files, each including encrypted network access credentials and an initialization data item. For each computer chip module, a credential file may be installed on the computer chip module, an identification and a secret value may be installed on the computer chip module, and binding software may be executed. The execution of the binding software may accept as input the identification and a derivation of the secret value and may cause extraction of the network access credentials if the identification and the secret value when input to a formula result in a match.

19 Claims, 5 Drawing Sheets

(51) Int. Cl.
*H04W 12/30* (2021.01)
*H04W 12/086* (2021.01)
*H04W 12/50* (2021.01)
*H04W 12/041* (2021.01)
*H04L 9/08* (2006.01)

(52) U.S. Cl.
CPC ......... *H04L 9/3271* (2013.01); *H04W 12/041* (2021.01); *H04W 12/086* (2021.01); *H04W 12/50* (2021.01)

(58) Field of Classification Search
CPC ...... H04W 12/04; H04W 4/50; H04L 9/0866; H04L 9/0869; H04L 9/3271
See application file for complete search history.

(56) References Cited

OTHER PUBLICATIONS

"Embedded Sim Remote Provisioning Architecture", *GSM Association*, Version 1.1. Jan. 30, 2014.
Bender, Harald, and Gerald Lehmann. "Evolution of SIM provisioning towards a flexible MCIM provisioning in M2M vertical industries." *2012 16th International Conference on Intelligence in Next Generation Networks.* IEEE, 2012.

\* cited by examiner

SYSTEM AND METHOD FOR SECURING DISASSOCIATED SECURITY CREDENTIALS

PRIOR APPLICATION INFORMATION

The present application is a National Phase Application of PCT International Application No. PCT/EP2019/062068, International Filing Date May 10, 2019, entitled "SYSTEM AND METHOD FOR SECURING DISASSOCIATED SECURITY CREDENTIALS", which claims benefit from provisional application Ser. No. 62/670,258, filed on May 11, 2018 and entitled "SYSTEM AND METHOD FOR SECURING DISASSOCIATED SECURITY CREDENTIALS", each of which being incorporated by reference herein in its entirety.

FIELD OF THE INVENTION

The invention relates generally to assigning credentials to devices, for example assigning wireless or cellular access credentials to computer modules or chipsets.

BACKGROUND OF THE INVENTION

In the field of the internet of things (IoT) devices such as appliances (e.g. refrigerators) or automobiles may include chipsets or computer modules (e.g. including one or more chips), such as the ME910G1 series of chipsets produced by Telit, Inc. that enable the device to communicate with a communications network such as a cellular network or other network. The cellular network may require credentials such as security credentials or network access credentials, such as a shared key—random AES128, to identify the equipment attempting to communicate over the network, to ensure only authorized or paid users are communicating over the network, to charge fees for network use, and/or other reasons. During the manufacture or configuration, by a module manufacturer, of modules or chipsets enabling such communication, a vendor of credentials, also known as a data processor ("DP") or SIM vendor, e.g. IDEMIA, may provide network authentication credentials (e.g. an Authentication Key (Ki)) to the module manufacturer which may install the network authentication credentials on a module or chipset. The network authentication credentials (e.g. an Authentication Key (Ki)) may achieve a result similar to that of a SIM card, but may be electronic data (as opposed to the physical item of a SIM card) installed on a module or chipset. A vendor of credentials or DP may desire that each set of credentials be installed on only one chipset to ensure that multiple devices do not take advantage of or use the same credential rights, for example to prevent a user for paying once for a set of credentials and using them more than once.

SUMMARY

A system and method for binding or assigning network access credentials to computer chip modules may include transmitting to a remote server a set of initialization data items each including an identification and a derivation of a secret value; and receiving from the remote server credential files, each including encrypted network access credentials and an initialization data item. For each computer chip module, a credential file may be installed on the computer chip module, an identification and a secret value may be installed on the computer chip module, and binding software may be executed. The execution of the binding software may accept as input the identification and a derivation of the secret value and may cause extraction of the network access credentials if the identification and the secret value when input to a formula result in a match.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may allow a vendor providing wireless or cellular access credentials to provide such credentials with some assurance that each set of credentials (where a "set of credentials" may include only one value) is installed on or bound to only one module or chipset. Embodiments of the present invention may allow secure transfer, storage and maintenance of credentials provided by a DP or vendor of credentials which are to be bound to or installed on a computer module (e.g. one or more chips or a chipset), from creation to module initialization. In some embodiments, during transfer credentials may be encrypted at most or all times. Embodiments may allow for the elimination of cloning of credentials or network access credentials by for example binding or installing network access credentials with each module at the data preparation stage. A combination of security information such as for example as a user or device ID or user or device name in combination with a password or "secret" (e.g. a random number) may be used to ensure the credentials are bound to one module. A manufacturer or assembler of chipsets, such as Telit, Inc., may obtain credentials from a DP or vendor of credentials and may install, insert or bind one set of network access credentials on each chipset such that the manufacturer has no real access to the credentials, and the vendor can be assured that each set of credentials is installed on only one chipset. Typically one set of network access credentials are meant for, specific to and used by one module or item of equipment. Network access credentials may include, e.g. the Ki authentication key as known in the telecommunications arts, or another key, value or data object used to authenticate on or grant access to a device with respect to a mobile, cellular or other wireless data network.

The modules or chipsets may be installed in IoT devices, for example to allow a home appliance such as an air conditioner to communicate with a wireless communications network such as a cellular network, while allowing the operator of the network (e.g. a cellular provider) to ensure the proper credentials are used to access the network and for example to charge fees for network use.

In one embodiment, each of a plurality of security or network authentication credentials (e.g. Ki) may be bound to or installed on each of a plurality of computer chip modules. A manufacturer of chip modules, or the entity owning or physically possessing the modules, may create a set of ID/secret combinations, each ID/secret combination including a user name or equipment or user ID and a secret value or password. A derivation of the secret value or password, which may be termed "Y", in combination with the user name or ID, may be sent to a remote server or computer operated by a vendor. The derivation may be for example a hash possibly in combination with other operations. The combination of the user ID and derivation may be termed initialization data, or an initialization data item. Binding software, typically created and/or configured by the manufacturer, may also be sent, e.g. by the manufacturer, or by another entity, to the vendor.

The vendor may create for each intended module or chipset installation a credential file, each credential file including network access credentials (e.g. a Ki) typically specific to one module and meant to be used by one module or equipment item; a derivation of a secret; and an equipment or user ID. Within a credential file network access credentials are typically encrypted such that the vendor and binding software can decrypt the credentials, but the manufacturer cannot (except via execution of binding software which does not reveal to the manufacturer the credentials). The vendor may send credential files corresponding to a number of modules to the manufacturer along with a copy (typically one) of the binding software. An individual credential file among the pool of credential files may be indexed to or linked to a module by for example the module ID being equivalent to the ID in or describing the appropriate credential file. The manufacturer may, for each computer chip module, install or insert on the computer chip module a credential file, an ID and a secret value or password. The credential files provided by the vendor may be indexed, labelled (e.g. named), or identified by module ID, and thus the manufacturer may determine which credential file to install on which module based on a match of the module ID and the ID associated with the credential file.

The manufacturer may, for each computer chip module, install or insert on the computer chip module a credential file and binding software. The credential file and binding software may be installed on a filesystem which may be based e.g. on flash memory on the module; when the binding software is executed it may be moved from flash memory to RAM (e.g. a file system) on the module. The ID and secret value or password may be installed on flash memory on the module by the manufacturer. Module software separate from the binding software may be installed as firmware (module software may be referred to as the firmware), and module software and binding software may communicate for example using application program interfaces (APIs). Module software may derive a value (e.g. Y) from the secret value, to be passed to the binding software. The binding software may be started by module software (e.g. by the firmware) and may be executed (e.g. by a processor which is part of the module). During the execution the binding software may receive or accept as input the identification and a derivation of the secret value, and the binding software may extract, decrypt or decode the security credentials if the identification and the derivation of the secret value when input to a formula, or an algorithm, result in a match with a value computed by the binding software. Binding software may be provided with a suitable private key by a vendor in order to decrypt or extract network access credentials, which may occur in the event of a match or "success". The security or network access credentials (e.g., Ki) may be extracted by known decryption methods and stored on a secure storage area on the module or chipset, as is known in the art, e.g. in flash memory. The module or chipset may then be installed in equipment such as a refrigerator, automobile, etc., and may use the credentials to exchange data with or communicate over a data network such as a cellular network.

Figure 1A:
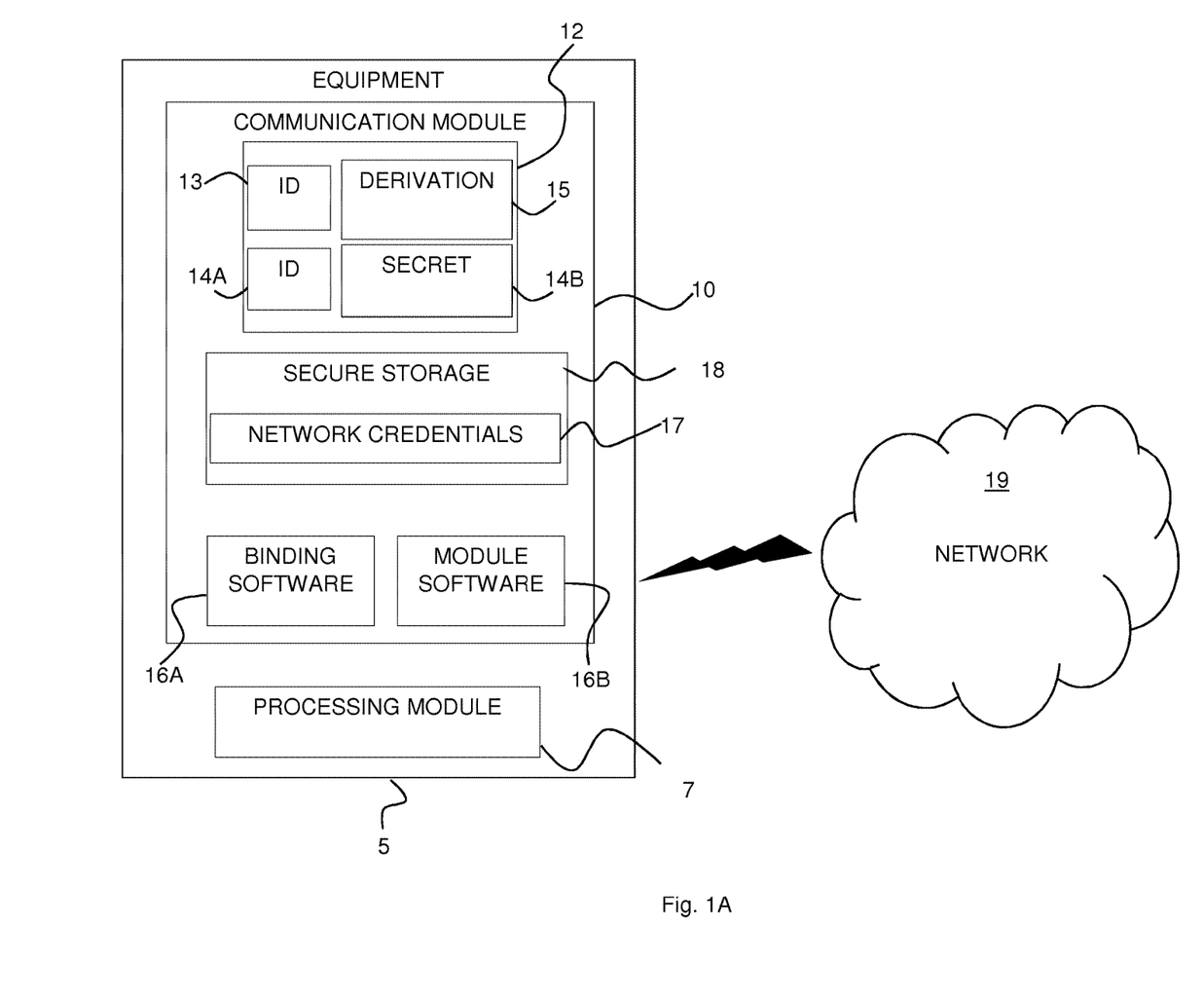
FIG. 1A is a block diagram of a system using credentials and modules to communicate, according to an embodiment of the present invention.
Figure 2:
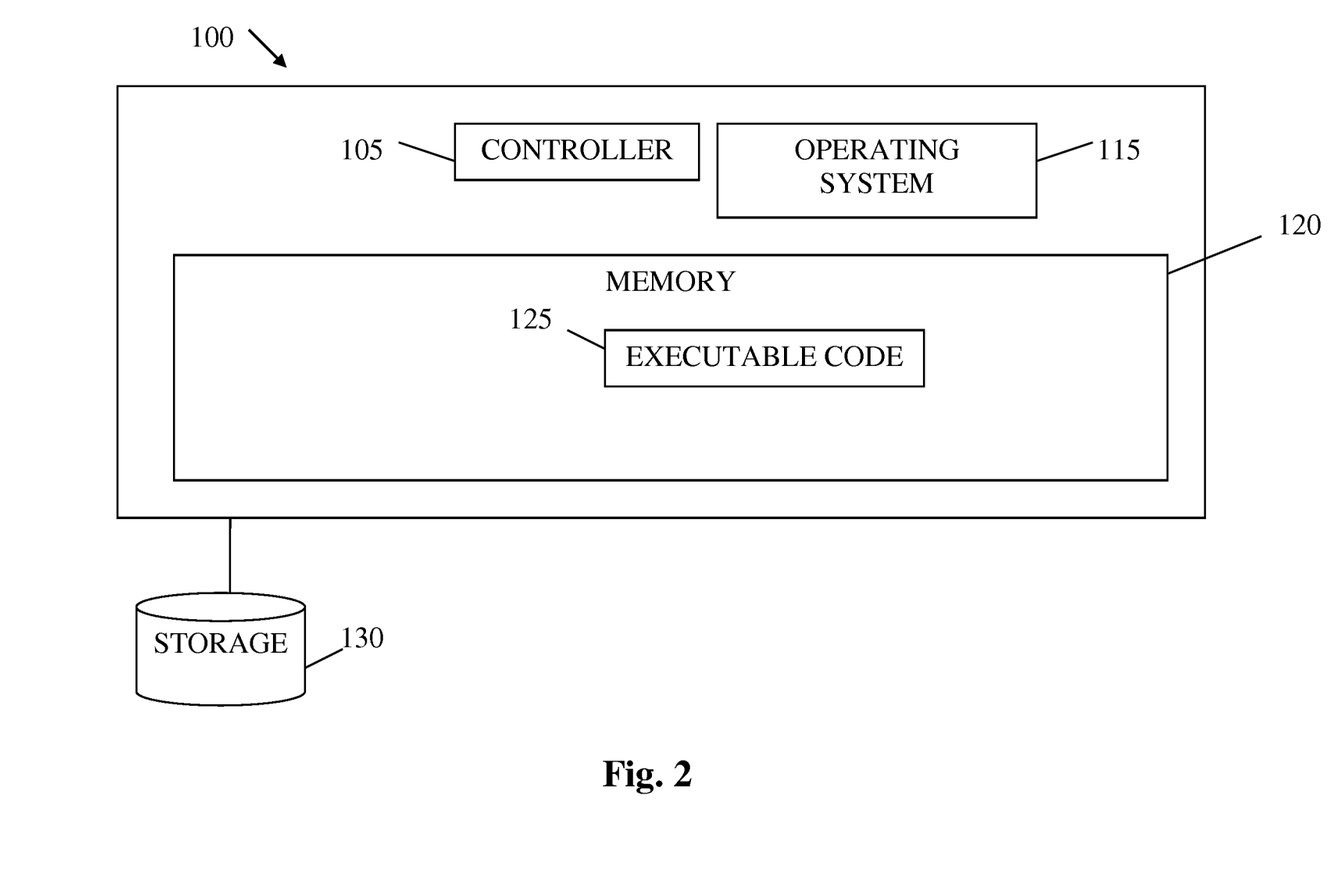
FIG. 2 is a high-level block diagram of an exemplary computing device which may be used with embodiments of the present invention.

FIG. 1A is a block diagram of a system using credentials and modules to communicate, according to an embodiment of the present invention. Equipment or device 5 (such as a refrigerator, air conditioner, mobile or portable computer, automobile, etc.) may include a processing module 7 (e.g. one or more computers, such as shown in FIG. 2), to operate equipment 5). Processing module 7 may communicate with communications module 10 (e.g. a chipset, or one or more computer chips), which in turn may communicate with cellular network 19 using stored network access credentials 17 via radio frequency (RF) or other wireless communications equipment. Security or network access credentials 17 may be or include a Ki; while credentials in the plural sense are described, in some cases credentials may include one value such as Ki. Other network access credentials may be used. Communications module 10 may include binding software 16A which may have been used to install network access credentials 17 on communications module 10 using an initialization data 12 item. Communications module software 16B may interact with binding software 16A to cause extraction of credentials 17, and perform other functions. Initialization data 12 may include for example an ID 13 (e.g. user ID, equipment ID or other identification) and a derivation of a secret or password 15. ID 13 and derivation 15 may be stored in a credential file on memory such as flash memory. Also stored on the module 10, but typically not accessible to binding software 16A, may be another copy of ID 13, stored as ID 14A (where ID 13 and ID 14A are the same), and secret or password 14B, where derivation 15 is the derivation of secret or password 14B. ID 14A and secret 14B may be stored on flash storage on a special partition accessible only by module software, and not binding software. A communications module manufacturer, such as Telit, Inc., may manufacture and/or configure communications module 10. Security or network access credentials 17 may be "bound to" a module, for example installed into and stored into a secure storage 18 (e.g. a specially accessed memory, e.g. a flash memory) by binding software 16A, after which data such as secret or password 14B, or other data, may be removed or deleted. Secure storage 18 may be encrypted. Security or network access credentials 17 may allow module 10 to access wireless network 19, in a manner similar to but not necessarily identical to the manner that a subscriber identity module ("SIM") card allows a mobile telephone to access a cellular network. While specific memory types such as RAM and flash memory, and specific types of data such as firmware, are discussed, in other embodiments the entities described may be stored on other combinations of and other types of memories or storage.

Figure 1B:
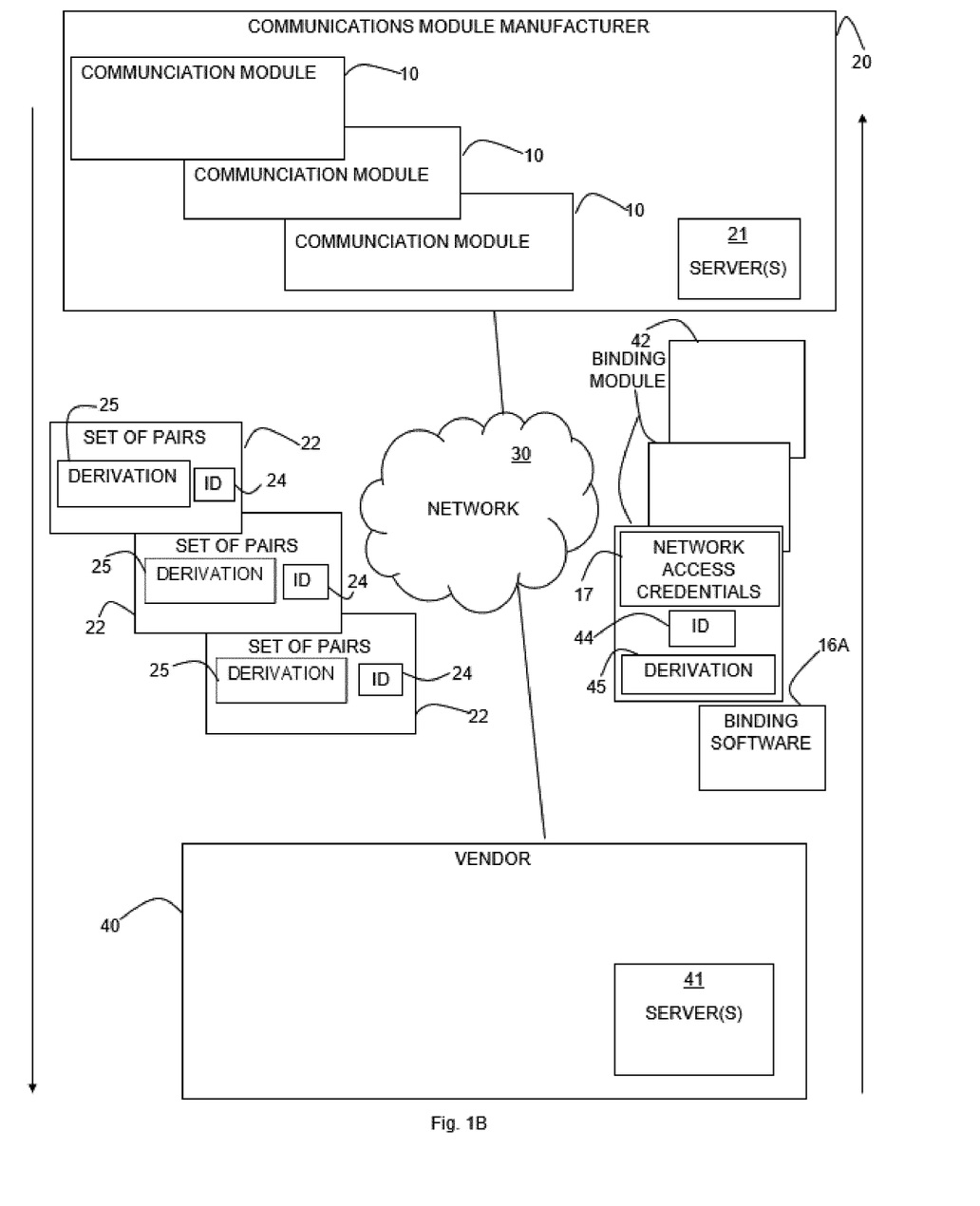
FIG. 1B is a block diagram of a system for assigning credentials to modules, according to an embodiment of the present invention.

FIG. 1B is a block diagram of a system for assigning credentials to modules, according to an embodiment of the present invention. A communications module manufacturer 20 may have, manufacture, or assemble numerous communications modules 10, and may exchange data and/or software such as credentials and binding software with a vendor or DP 40. Communications module manufacturer 20 may operate one or more servers or other computers 21 to, e.g. store data, perform operations as described herein, install software on and/or test modules, etc. Vendor or DP 40 may include one or more servers or other computers 41 (which may be considered servers or computers remote to the manufacturer) for performing operations as described herein.

Communications module manufacturer 20 may have physical possession of a number of chips, modules and chipsets 10, and may desire to install network access credentials on the chipsets 10, the access credentials supplied by DP 40, which in turn may desire to ensure only one credential is installed on each module. For example, communications module manufacturer 20 may send or transmit (e.g. via a network 30 such as the internet, using, for example, SFTP (SSH File Transfer Protocol) or another transfer protocol) a set of initialization data items or pairs 22 of IDs 24 and derivations 25 of secrets (which may be termed "Y") to vendor or DP 40. Vendor or DP 40 may operate, or be or considered to, be a remote computer server or remote computer device relative to manufacturer 20. Vendor or DP 40 may, for each initialization data or pair 22, create a credential file 42 including security or network access credentials 17 (typically encrypted), and ID 44 and derivation 45 of the secret corresponding to the ID 44 (e.g. a combination of ID and derivation). Vendor or DP 40 may transmit binding software 16A to communications module manufacturer 20, possibly after modifying it with e.g., a private key or other data, to be able to decrypt or extract network credentials 17. Typically one copy of binding software 16A is sent with a number of credential files 42.

Vendor 40 may transmit credential files 42 to communications module manufacturer 20, which may then install one credential file 42, and one copy of binding software 16A, on each communications module 10. Communications module manufacturer 20 may for each communications module 10 cause or signal binding software 16A to execute in conjunction with module software 16B, and may use a set of initialization data (e.g. ID 13 and derivation of secret or password 15), to extract, decrypt, derive or calculate, and install, communications or network access credentials 17 on the communications module 10.

In one embodiment, when executing binding software 16A (e.g. by a processor on a module 10), binding software 16A may receive or accept as input (e.g. from module software 16B) the identification and a derivation (e.g. hash) of the secret value or password specific to or unique to communications module 10. If the ID 14A and the secret 14B stored in module 10 by the manufacturer, and the ID 13 and the derivation (e.g. Y) 15 stored in the credential file, when input to a formula, result in a match or equality with a value determined by binding software 16A, binding software 16A may decrypt, extract or cause extraction of the security credentials 17, which when sent from vendor 40 may be encrypted by known methods. Typically binding software 16A, but not manufacturer 20 and not module software 16B, is capable of decrypting credentials 17. Communications module 10 may then (typically after installation in another device) use security credentials 17 to access a network. If the ID 14A and the secret 14B stored in module 10 by the manufacturer, and the ID 13 and the derivation (e.g. Y) 15 stored in the credential file, when input to a formula, do not result in a match or equality, binding software 16A will not extract or cause extraction of the security credentials and other actions may be taken, e.g. alerting a manufacturer 20.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of computer or hardware modules, entities and equipment such as device 5, processing module 7, communications module 10, binding software 16A, module software 16B, servers 21 and 41, or other equipment or modules discussed herein may be or include, or may be executed on, a computing device such as included in FIG. 2, although various units among these modules may be combined into one computing device or spread across multiple computing devices. For example, a device including a first processor as shown in FIG. 2 may load binding software to a module, the module including a second processor as shown in FIG. 2 to authenticate and determine if a match exists.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, memory to store firmware, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3 and 4, according to embodiments of the present invention. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, flash memory, a hard disk drive, a floppy disk drive, a Compact Disk (CD) drive, a CD-Recordable (CD-R) drive, a universal serial bus (USB) device or other suitable removable and/or fixed storage unit. Data such as network access credentials, device IDs, passwords, etc. may be stored in a storage 130 and may be loaded from storage 130 into a memory 120 where it may be processed by controller 105. In some embodiments, some of the components shown in FIG. 2 may be omitted. Device 100 may include if embodying certain equipment (e.g. a chipset or module as described herein) any applicable input/output (I/O) device. For example, a device for connecting to a cellular data or voice network may be included in a module or chipset. In the case of a server as described, a device may be included for interfacing with a wired or other network, and if needed suitable other I/O devices.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In one embodiment a set of formulas are used with the example process shown below with respect to FIGS. 3 and 4, but other formulas may be used. Typically, the same hash function is used in the registration phase and the authentication phase described herein. In one embodiment, during a registration phase, a manufacturer may create a set of pairs of ID (e.g. module ID, username) and secret pairs, and from this create a set of ID and derivation pairs, where the derivation is a derivation of calculation (e.g. using at least in part a hash) of the secret or password. The ID-derivation pairs are provided to a vendor. The manufacturer and vendor may agree in advance on a combination $\{G, g_0\}$ where G is a cyclic group per known group theory. G may include, e.g. a fixed number of ordered and consecutive integers $g_x$ (g sub x). The manufacturer and vendor may also agree on a $g_0$ (g sub 0), a member of G picked randomly. To create the pairs, the manufacturer may hash the password to produce x=Hash (password). Various hash functions may be used, such as the SHA-1 Cryptographic Hash Algorithm. Typically the same derivation function or hash function is used in other parts of the process where a hash function is used such as the authentication phase. The manufacturer may compute derived value $Y=g_0^x$ modulo G: ($g_0$ raised to the power of hash(password)) modulo G. (E.g. the m'th member of G, where m=($g_0^x$ modulo the number of members of G)). The pair ID and derived value Y is sent to the vendor. Other methods of creating a derived value may be used, and other hash functions may be used.

During an authentication phase, binding software 16A executing on a module (e.g. "representing" the vendor) may interact with module software 16B executing on a module (e.g. "representing" the manufacturer) to extract network access credentials. The ID 44 and derivation 45 received from the vendor, which may be part of or constitute a credentials file, may be stored on the module, e.g. in volatile memory, and the binding software 16A and module software 16B may be stored on the module, binding software typically in flash memory and/or RAM, and module software typically as firmware. Typically, a credential file or its data (e.g. an ID and a derivation of a secret) may be stored in flash memory, and an ID (the same as in the credential file) and the secret (from which the derivation is made) may be stored in a portion of flash memory the binding software cannot access. For example, the ID/secret pair may be stored in a segregated or special portion of flash memory that the binding software 16A cannot access. The specific credentials file may be stored on a module having the same ID as that in the credentials file. Binding software 16A may generate a random one-time number or token "a" (e.g. a 32 bit number), and provide or send it to module software 16B, e.g. via an API. Module software 16B may compute a hash x on the password corresponding to the ID for the module ("x"=hash (password) where the hash function is the same as used in the registration phase). Module software 16B may compute $Y=g_0^x$ modulo G, where group G and value $g_0$ are those agreed upon previously by the manufacturer and vendor, and are the values used in the initialization phase. Module software 16B may generate a random number $r_x$ on G (where $r_x$ is a member of group G) and may calculate $T_1=g_0^{r_x}$ modulo G. Module software 16B may calculate $c_0$=hash(Y+$T_1$+a) modulo G where the hash function is the same as used elsewhere, and may calculate $z_x=r_x-c_0^x$ modulo G, where $c_0^x$ is $c_0$ multiplied by x. Module software 16B may send ($c_0, z_x$) to binding software 16A, and binding software 16A may calculate $T_2=Y^{c_0}g_0^{z_x}$ modulo G. Binding software 16A may verify that $c_1$=hash(Y+$T_2$+a) modulo G, where the hash function is the same as used elsewhere in the process. If the comparison by binding software 16A of $c_1$ to hash (Y+$T_2$+a) modulo G results in a determination that they are equal, binding software 16A has authenticated; i.e. if $c_0=c_1$ positive or successful authentication takes place and binding software 16A may decrypt or extract network authentication credentials 17. If $c_0$ does not equal $c_1$ authentication is unsuccessful, no decryption or extraction of network authentication credentials 17 takes place, and a notification or alert may be sent to manufacturer. Thus, the binding software may accepting as input the ID and a derivation of the secret value and may cause extraction of the network access credentials if the identification and the secret value when input to a formula as discussed result in a match or equality.

In one embodiment a match may results when a value calculated by module software using the derivation of the secret value, a random one-time token a generated by the binding software, and a group G, is equal to a value calculated by the binding software using the derivation of the secret value, the random one-time token a and the group G.

Figure 3:
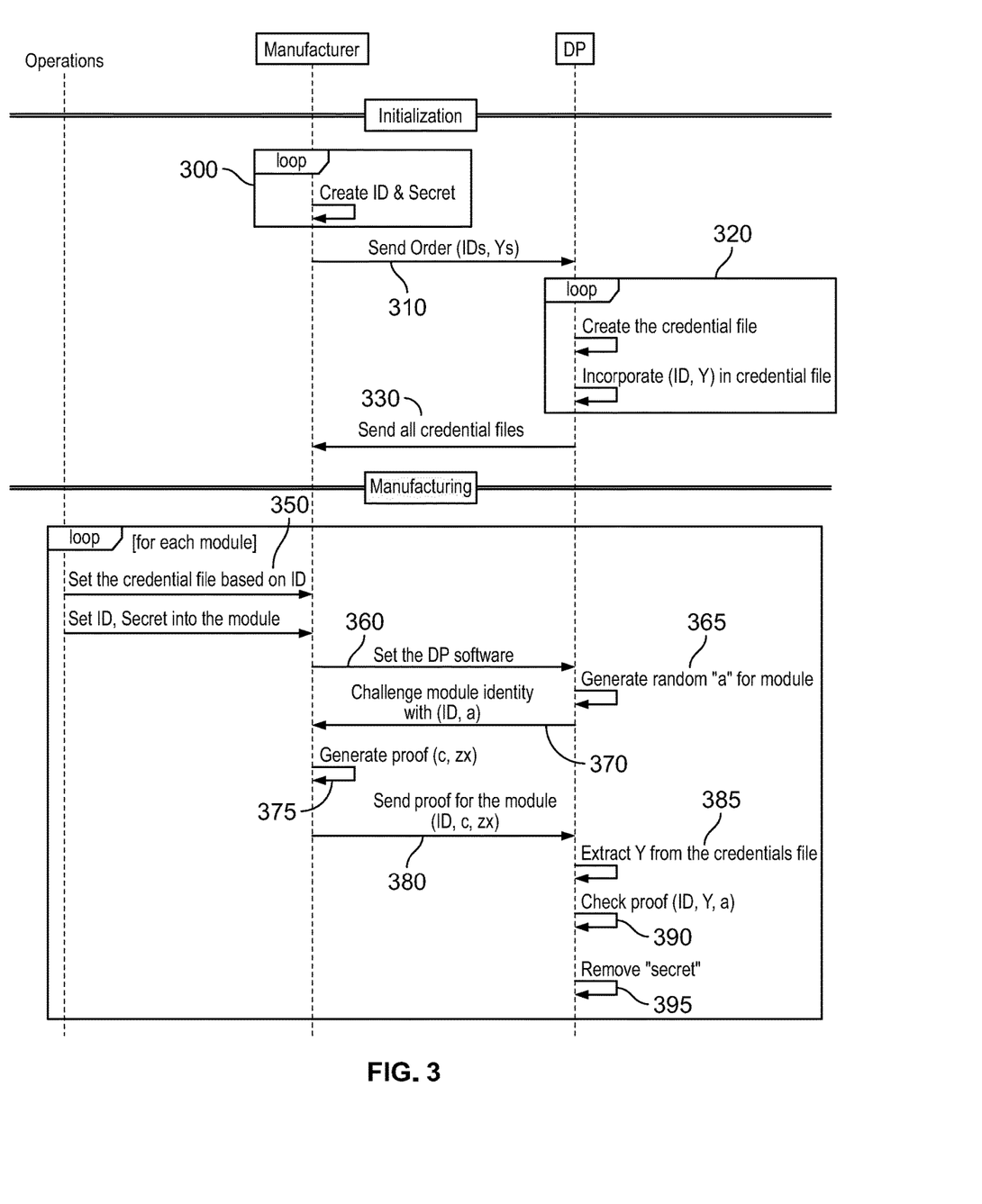
FIG. 3 is a flowchart of a method according to embodiments of the present invention.
Figure 4:
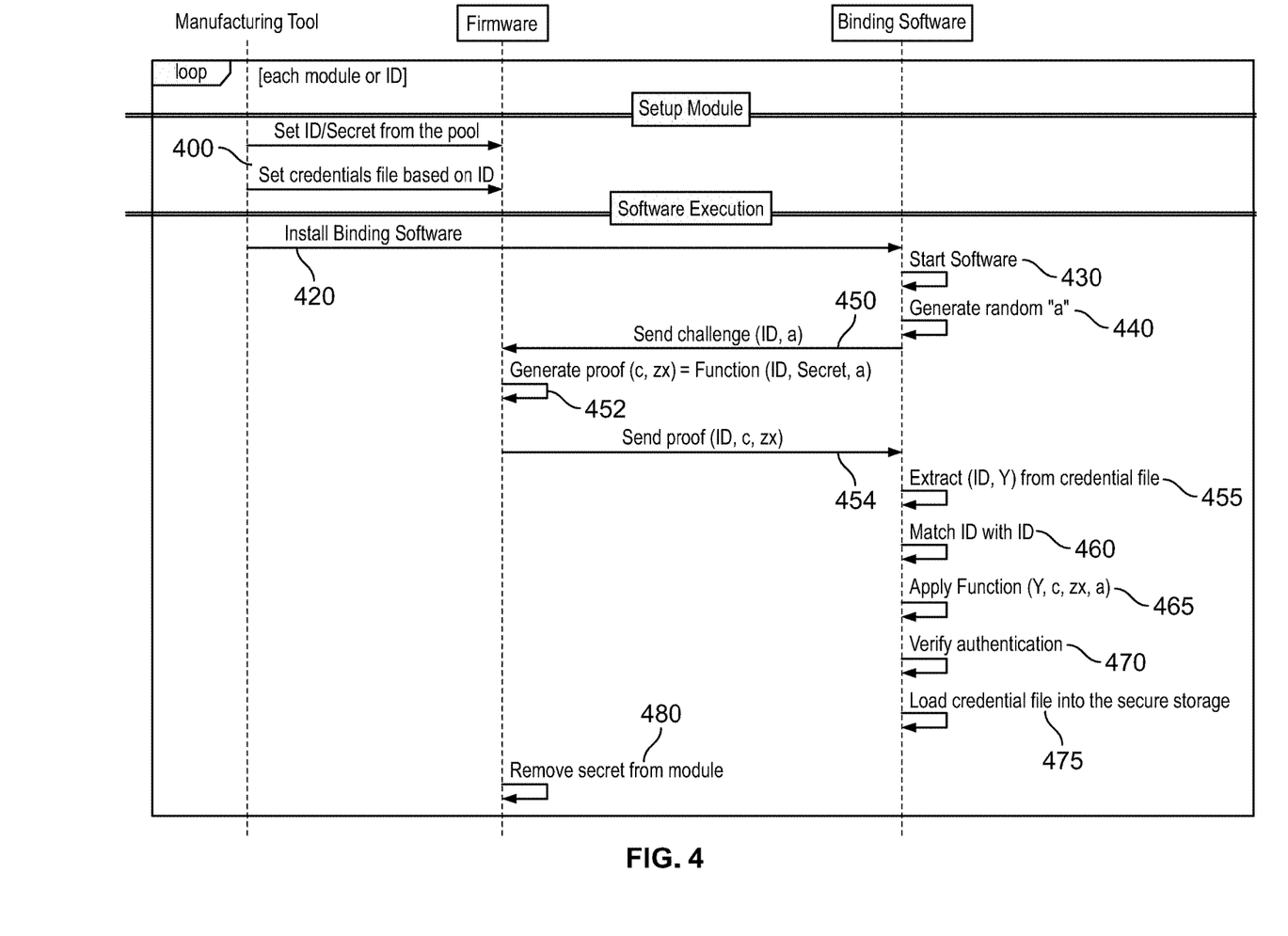
FIG. 4 is a flowchart of a method according to embodiments of the present invention.

FIGS. 3 and 4 are flowcharts of methods according to embodiments of the present invention, for binding credentials to computer modules. While in one embodiment the operations of FIGS. 3 and 4 are carried out using systems as shown in FIGS. 1 and 2, in other embodiments other systems and equipment can be used. Typically, the algorithms presented above for the registration phase and the authentication phase are used with example embodiments shown in FIGS. 3 and 4.

In one embodiment, during a registration phase communications module manufacturer 20 and a vendor 40 may agree on a group G of N elements, for example an ordered list of N integers, and may also agree on a $g_0$ of G. A public key agreed upon may then be, e.g., pi ("public information")=$\{G, g_0\}$. The agreement between a vendor and manufacturer of, for example, G or other data items is typically used across multiple module bindings and may be persistent and/or may expire after a certain amount of time (e.g. X months) and/or a certain number of modules manufactured or credentials bound.

In operation 300, a "user", typically communications module manufacturer 20, may create or assign for each module or chipset which is to have network access credentials installed (e.g. in a loop or iteration process), an ID (e.g. username) and secret or password, each for example being a 32 bit number. Other formats may be used for an ID and secret, and for the random or other numbers described herein. A derived value or derivation based on the secret or password may be calculated. To create a derived value the secret or password value may be processed using a formula such as described herein (e.g. using a hash function on the password, and raising a pre-agreed upon member of a group G to the power of the result of the hash, and performing a modulo G operation on the result to obtain a member of group G). For example, in one embodiment derived value $Y=g_0^x$ modulo G ($g_0$ raised to the power of x, where x is the hash of the password, the result input to modulo G) may be computed. This may be performed (e.g. in a loop or iteration) for each of a number of communications modules or chipsets 10.

In operation 310, the sets of ID and derived value (e.g. Y) combinations (e.g. an "order"), each of which may be a set of initialization data, may be sent to vendor or DP 40, e.g. via a network such as network 30, or by other methods.

In operation 320, vendor or DP 40 may receive or accept a set or number of ID and derived value (e.g. Y) combinations or pairs, e.g. sets of initialization data, and for each initialization data combination, may create a credential file including or incorporating security or network access credentials 17 (typically encrypted such that only binding software may access it), ID 44 and derivation 45 and in operation 330 may send the credential file along with binding software to the module manufacturer 20, e.g. via a network such as network 30, or by other methods. Typically vendor 40 does not know the secret or password value from which the derived value is created. Module manufacturer 20 may receive or accept the set of credential files, and the binding software from DP or vendor 40. Vendor 40 may be considered to be, or may operate, a server or computer device, which carries out aspects of the present invention, and which may be remote from manufacturer 20. Typically only one copy of binding software is sent from DP or vendor 40 to manufacturer 20, but multiple copies may be sent.

An authentication phase may determine whether or not access credentials may be extracted for a communication module. In an authentication stage binding software may be executed, which may result in the binding software accepting data and, if a match or successful authentication results, extracting or decrypting authentication data. In operation 350 (also shown in operation 400), manufacturer 20 may install or load one credential file (typically into flash memory) each to a module, and may load into a separate location on the module the ID and password or secret. In such a manner binding software may have access to the ID and a derivation of the password or secret; and module software may have access to the ID and the secret or password. In operation 360 (also shown in operation 420), manufacturer 20 may install or load one copy of binding software (e.g. in flash memory to be loaded to RAM to execute) to a module (binding software may be the same across modules). Each credential file is typically specific to one module, for example correlated by ID. Each credential file loaded to a module is typically meant to be used by one module or equipment item and may include a derivation (e.g. Y) of a password; an equipment or user ID specific to or matching the module on which it is installed); and encrypted network access credentials (e.g. a Ki) specific to the module. A separate credential file may be installed on each of a number of communications modules 10. The manufacturer 20 may loop or iterate, in each loop or iteration installing or loading on a module a credential file. Each credential file may be identified, labelled, or indexed with or using an ID of a module, or a modification or derivation of the ID, with typically a one-to-one correlation between each credential file and one module, such that only one module is associated with one file and vice versa. From the pool or set of credential files, a credential file having the same ID as the module (e.g. where the received identification is equal to the module identification) may be selected and installed on the module. Within each credential file, the network authentication or access credential is typically encrypted such that a module manufacturer cannot access the network authentication or access credential.

Binding software and module software may be executed on the module (operation 430), and may pass data between them using for example an API. In operation 365, also shown as 440, binding software may generate a random number "a". In operation 370, also shown as operation 450, binding software may use random number "a" and the ID for the module to present (e.g. pass or send) a "challenge" to the module software (which in some embodiments may be known as the firmware), which may then create values to pass back to the binding software for further processing and a "match" comparison. In operation 375, also shown as operation 452, values ($c_0$, $z_x$) may be generated by module software as described herein (e.g. using the random number a, a hash function, and a group G, among other values and functions) and sent or passed in operation 380, also shown in operation 454, to binding software possibly along with the ID. In operations 380 and 454, module software may send "proof" (e.g. a set of numbers offering proof that the binding software is executing on a module with the correct ID) in the form of, e.g. the ID and values ($c_0$, $z_x$) to binding software. In operation 385, also shown as operation 455, binding software may extract the derived value Y of the password from e.g. the credentials file stored on the module's flash memory or file system. In operation 460, binding software may match or compare the ID in the credential file with the ID received from the module software: if the two IDs are not the same, an error is flagged (e.g. reported) and the network access credentials are not decrypted and installed. If the two IDs are the same, the process may continue. In operation 390, also shown as operation 465, binding software may authenticate the module using the formula discussed elsewhere herein, e.g. by calculating $T_2=Y^{c_0}g_0^{z_x}$ modulo G and determining whether or not received $c_0=c_1$ where $c_1$=Hash $(Y+T_2+a)$. If the values are equal (a "match") authentication is positive (e.g. operation 470) and network credentials may be decrypted and stored (e.g. operation 475) on the module, and in operation 395, also shown as operation 480, the secret or password may be removed or erased from the module by module software, e.g. by the firmware.

In one embodiment, binding software may generate or calculate a random number "a" and may send or pass a to module software, which may generate or calculate a value c and a value z using value a, a hash function, a secret value, and a group G, and other data or functions, and which may pass c and z, possibly with other data, to the binding software. The binding software may apply c and z to a function using a derivation of the secret value to determine if value c is equal to the value of the function. If value c is equal to the value of the function, the binding software may determine a "match".

Uniqueness, or specificity of one network credential being installed on only one module, may be guaranteed in that each module may have a unique ID (unique in the sense of the set of modules, not necessarily over the entire universe of possible modules), and each credential file may have a similarly unique ID, one credential file matching one module. An ID may be bound to a module.

The operations of FIGS. 3 and 4 are examples only, and different operations may occur in different embodiments.

A communication module 10 may, when installed in equipment, use the network access credentials to access a wireless network such as a cellular network. For example, equipment or device 5 may use processing module 7 to exchange data with e.g., a remote server, another device, etc., by having module 10 communicate with a cellular network, which may require access credentials for use or access.

Embodiments of the invention may improve the technologies of telecommunications and computer hardware manufacturing. For example, in some embodiments, assurance may be provided that a set of network access credentials are installed on only one chipset or computer module. In some embodiments the credential files when prepared are disassociated from their physical placement in modules.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for binding a plurality of network access credentials to a plurality of computer chip modules, the method comprising, using one or more computer processing devices:
    transmitting to a remote server a set of initialization data items each initialization data item comprising an identification and a derivation of a secret value;
    receiving from the remote server a set of credential files, each credential file comprising encrypted network access credentials and an initialization data item;
    for each computer chip module:
        installing on the computer chip module a credential file;
        installing on the computer chip module an identification and a secret value on which the derivation is based;
        executing binding software, the execution of the binding software accepting as input the identification and the derivation of the secret value to determine a value and causing extraction of the network access credentials if the identification and the secret value when input to a formula result in a match with said determined value.

2. The method of claim 1, comprising using the network access credentials to access a wireless network.

3. The method of claim 1 wherein the computer chip module is to access a wireless network.

4. The method of claim 1 comprising receiving from the remote server binding software.

5. The method of claim 1, wherein the formula includes $c_1=\text{Hash}(Y+T_2+a)$ where Y is the derivation of the secret value, $T_2=Y^{c_0}g_0^{z_x}$ modulo G, G is a group, $g_0$ is a member of G, $c^0$ is derived from the hash of a value calculated from (Y, $g_0^{r_x}$ modulo G, and a), a is a random number and is $r^x$ is a member of G.

6. The method of claim 1, wherein a match results when a value calculated by a first software module using the derivation of the secret value, a random one-time token a generated by the binding software, and a group G, is equal to a value calculated by the binding software using the derivation of the secret value, the random one-time token a and the group G.

7. The method of claim 6 wherein the secret value is stored on a memory on the computer chip module and the binding software cannot access the secret value and the first software module can access the secret value.

8. A method for installing a network authentication credential on a computer module, the method comprising, using a processor:
    a first software module generating a random number a and passing a to a second software module;
    the second software module calculating a value c and a value z using a, a hash function, a secret value, and a group G and passing c and z to the first software module;
    the first software module applying c and z to a function using a derivation of the secret value to determine if value c is equal to the value of the function; and
    if value c is equal to the value of the function, the first software module causing decryption of the network authentication credential.

9. The method of claim 8, comprising using the network access credentials to access a wireless network.

10. The method of claim 8 wherein the computer module is to access a wireless network.

11. The method of claim 8 comprising receiving from a remote server the first software module and installing the first software module on the computer module.

12. The method of claim 8 wherein the secret value is stored on a memory on the computer module and the first software module cannot access the secret value and the second software module can access the secret value.

13. A system for binding a plurality of network access credentials to a plurality of computer chip modules, the system comprising:
- a memory; and
- a first processor to:
  - transmit to a remote server a set of initialization data items each initialization data item comprising an identification and a derivation of a secret value;
  - receive from the remote server a set of credential files, each credential file comprising encrypted network access credentials and an initialization data item;
  - for each computer chip module:
    - install on the computer chip module a credential file;
    - install on the computer chip module an identification and a secret value on which the derivation is based; and
    - execute using a second processor binding software, the execution of the binding software accepting as input the identification and the derivation of the secret value to determine a value and causing extraction of the network access credentials if the identification and the secret value when input to a formula result in a match with said determined value.

14. The system of claim 13, wherein the second processor uses the network access credentials to access a wireless network.

15. The system of claim 13 wherein the computer chip module is to access a wireless network.

16. The system of claim 13 wherein the first processor is to receive from the remote server binding software.

17. The system of claim 13, wherein the formula includes $c_1 = \text{Hash}(Y+T_2+a)$ where Y is the derivation of the secret value, $T_2 = Y^{c_0} g_0^{z_x}$ modulo G, G is a group, $g_0$ is a member of G, $c^0$ is derived from the hash of a value calculated from (Y, $g_0^{r_x}$ modulo G, and a), a is a random number and is $r^x$ is a member of G.

18. The system of claim 13, wherein a match results when a value calculated by a first software module using the derivation of the secret value, a random one-time token a generated by the binding software, and a group G, is equal to a value calculated by the binding software using the derivation of the secret value, the random one-time token a and the group G.

19. The system of claim 18 wherein the secret value is stored on a memory on the computer chip module and the binding software cannot access the secret value and the first software module can access the secret value.

* * * * *